March 27, 1934. H. L. VAN VALKENBURG 1,952,299
TIME RELAY FOR POWER CONTROL
Filed Dec. 5, 1932
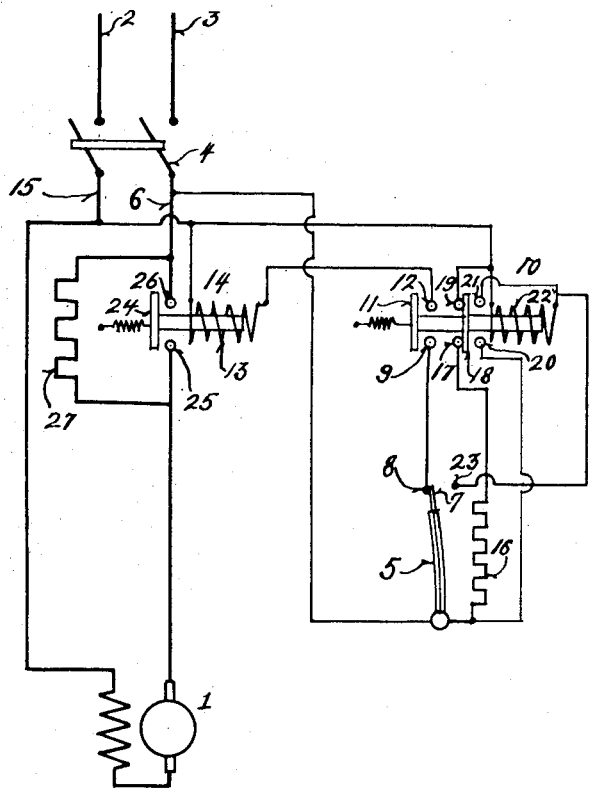
INVENTOR
Herman L. Van Valkenburg
BY
Arthur R. Woolfolk
ATTORNEY Patented Mar. 27, 1934

1,952,299

UNITED STATES PATENT OFFICE 1,952,299

TIME RELAY FOR POWER CONTROL

Hermon L. Van Valkenburg, Wauwatosa, Wis., assignor to Square D Company, Detroit, Mich.

Application December 5, 1932, Serial No. 645,765

1 Claim. (Cl. 172—288)

This invention relates to a time relay for power control.

In certain installations it is desirable that a time interval be automatically provided after a control circuit or the power circuit is closed before the translating device is connected directly to the power supply mains.

An illustration of this type of installation is found in starting devices for deep well pump motors. In the past considerable trouble has been experienced with pump shaftings breaking on deep well pump installations, or with the shearing off of the rotor blades of the pump. The trouble was found to be due to the re-starting of the motor before the water had cleared out of the pump and out of the pump column. In deep well pump installations the motor is rotated in the reverse direction when the power to the motor is cut off. The dropping column of water causes this reverse rotation of the motor. It can be readily seen that if the motor is re-started before the water has cleared out of the column, the motor would tend to operate in the forward direction of rotation, thereby causing a terrific strain on the shafting and on other parts of the pump and associated mechanism which frequently causes breakage of the shafting or shearing of the blades of the pump.

This invention is designed to overcome the above noted defects and objects of this invention are to provide a time relay for power control which is so made that the relay automatically interposes a time interval after the control circuit or main circuit has been closed so that the power cannot be turned on either fully or partially, depending upon the particular installation, until after the elapse of a certain predetermined interval of time.

In greater detail, objects of this invention are to provide an automatic time relay in which a thermal element is employed as the control element, in which means are provided for heating this thermal element, and in which the time interval of both heating and cooling is utilized so that although the thermal element may have operated shortly before this second action, nevertheless even though it or its associated parts may be slightly heated, the cooling interval as well as this shortened heating interval comes into play and the power is not turned on by the automatic mechanism until the thermal element has followed the sequence of being alternately heated and cooled.

Further objects are to provide a novel form of time relay in which a very simple construction can be followed involving a thermal element electrically heated when the circuit is closed, an auxiliary contactor associated therewith and thrown into operation when the thermal element is heated to a predetermined degree, and a main contactor whose control circuit is closed jointly by the thermal element after it has closed and the auxiliary contactor after it has been initially actuated, thereby securing the double period of heating and cooling of the thermal element before actuation of the main contactor.

An embodiment of the invention is shown in the accompanying drawing, in which:—

The single figure is a diagrammatic view of the apparatus.

Referring to the drawing, it will be seen that an electric motor has been indicated generally by the reference character 1 and is adapted to be supplied from the power mains 2 and 3.

A manually operable switch or an automatically controlled switch 4 may be employed to connect the entire apparatus with the power mains. This motor or other translating device may be designed for operation by either direct or alternating current, as desired, as the time relay may be employed with either alternating or direct current.

The time relay consists of a thermal element such as a bimetallic element 5, one end of which is connected to a conductor 6 and the other end of which is movable and is provided with a movable contact 7. Normally this contact engages the stationary contact 8 when the thermal element is cooled. The contact 8 is connected to a contact 9 of an automatic contactor indicated generally by the reference character 10. This contact 9 is adapted to be connected by the movable contact 11 of the automatic contactor with a stationary contact 12 when the automatic contactor 10 has been actuated. The contact 12 is connected to one end of the magnet coil 13 of the main contactor indicated generally by the reference character 14. The other end of this magnet coil is connected to the conductor 15. It will be seen, however, that this circuit is open until the auxiliary contactor 10 has closed.

A heating element 16 is provided for the thermal element 5 and has one end thereof connected to the conductor 6, as indicated, and the other end connected to a stationary contact 17 which is normally connected by means of the movable contact 18 of the auxiliary contactor 10 to the stationary contact 19, and from thence to the conductor 15.

It is apparent, therefore, that when the main switch 4 is closed, the heating element 16 is energized until the auxiliary contactor 10 operates. When the auxiliary contactor 10 closes, the stationary contacts 20 and 21 are connected by the movable contact 18 and thus a holding circuit is established for the magnet coil 22 of the auxiliary contactor and also the heating circuit for the element 16 is opened. In addition to this, the contacts 9 and 12 are bridged by the movable contact 11. This operation occurs when the heating element 5 has moved from the contact 8 to the contact 23. However, the main contactor 14 is not closed at this time as the movable contact 7 of the thermal element 5 is out of engagement with the stationary contact 8. When the thermal element cools, it moves back until the contacts 7 and 8 are in engagement and at this time the holding circuit for the main contactor 14 is closed. This main contactor therefore closes, its movable contact 24 bridging the stationary contacts 25 and 26.

This main contactor may be used to either close the motor circuit or else to cut out a starting resistance 27, the latter construction being shown in the drawing. It is obvious, however, that if the starting resistance 27 were omitted, that the main contactor would then close the motor circuit. With the arrangement shown diagrammatically in the drawing, it is apparent that the motor is first started when the switch 4 is closed and thereafter is brought up to speed when the main contactor operates to cut out the starting resistance 27. The invention, however, is not limited to this specific example or form, as any mode of controlling the motor from the main contactor could readily be followed, as has been indicated hereinabove.

It is apparent that the main switch 4 could be a manually operated or an automatically operated switch, and when this switch is closed that the heating circuit for the time relay is closed. The thermal element heats up and causes the closing of the auxiliary contactor 10 which opens the heating circuit of the thermal element. Thereafter when the thermal element cools and moves back to its initial position, the main contactor closes and the motor or other translating device is thereby controlled. It is also clear that this power control system could be employed for other purposes than motor control, if desired, without departing from the spirit of the invention.

Therefore, although this invention has been described in considerable detail, it is to be understood that such description is intended as illustrative rather than limiting, as the invention may be variously embodied and is to be interpreted as claimed.

I claim:

The combination of a power line, a motor, a main switch interposed between said motor and power line, a resistance in series with said motor, a main contactor for short-circuiting said resistance and having a control circuit, an auxiliary contactor having a control circuit, a thermal element controlling said auxiliary contactor, a heating element for heating said thermal element, said heating element having its circuit closed by said main switch and said auxiliary contactor when said auxiliary contactor is in inactive position, said thermal element when in heating position closing the control circuit of said auxiliary contactor, said auxiliary contactor having a holding circuit and said auxiliary contactor and thermal element jointly closing the control circuit of said main contactor when said auxiliary contactor is in operative position, and said thermal element in its cooled position.

HERMON L. VAN VALKENBURG.